(12) United States Patent
Appleyard et al.

(10) Patent No.: US 11,545,028 B2
(45) Date of Patent: Jan. 3, 2023

(54) WIRELESS MONITORING/CONTROL (71) Applicant: Lazer Safe Pty Ltd, Malaga (AU)

(72) Inventors: Robert Meredith Appleyard, Cottesloe (AU); Paul Andrew Gould, Malaga (AU); Ian Costley, Prevelly (AU); Luke Zbigniew Wooldridge, Malaga (AU)

(73) Assignee: Lazer Safe Pty Ltd, Malaga (AU)

( * ) Notice: Subject to any disclaimer, the term of this patent is extended or adjusted under 35 U.S.C. 154(b) by 0 days.

(21) Appl. No.: 17/284,843

(22) PCT Filed: Oct. 22, 2019

(86) PCT No.: PCT/AU2019/051153
§ 371 (c)(1),
(2) Date: Apr. 13, 2021

(87) PCT Pub. No.: WO2020/082120
PCT Pub. Date: Apr. 30, 2020

(65) Prior Publication Data
US 2022/0130233 A1    Apr. 28, 2022

(30) Foreign Application Priority Data

Oct. 22, 2018    (AU) ................................ 2018904006

(51) Int. Cl.
*G08C 17/02*    (2006.01)
*G01S 11/16*    (2006.01)
(52) U.S. Cl.
CPC .............. *G08C 17/02* (2013.01); *G01S 11/16* (2013.01); *G08C 2201/30* (2013.01); *G08C 2201/91* (2013.01)

(58) Field of Classification Search
CPC ................ G08C 17/02; G08C 2201/30; G08C 2201/91; G08C 2201/63; G08C 2201/114; G01S 11/16
See application file for complete search history.

(56) References Cited

U.S. PATENT DOCUMENTS

| 5,491,670 | A | * | 2/1996 | Weber | .................. | G05D 1/0255 |
| | | | | | | 367/128 |
| 6,791,467 | B1 | * | 9/2004 | Ben-Ze'ev | ............. | H05B 47/19 |
| | | | | | | 345/169 |

(Continued)

FOREIGN PATENT DOCUMENTS

JP    2005066752 A    3/2005
JP    2005159483 A    6/2005

(Continued)

OTHER PUBLICATIONS

European Patent Office Extended Search Report for Application No. 19875963.1 dated Nov. 19, 2021 (8 pages).

(Continued)

*Primary Examiner* — Brian E Miller
(74) *Attorney, Agent, or Firm* — Michael Best & Friedrich LLP (57) ABSTRACT

Dual channel wireless communication system for monitoring and/or control of a machine (112), such as a press brake, by a remote interface device (10, 12) that communicates data with a machine controller (18) over two channels CH1, CH2 in parallel. Also, a system and method to determine whether a remote interface device (10, 12) is within a range or zone of a machine (112) that the remote interface device wirelessly monitors and/or controls, uses an ultrasound transmitter-receiver arrangement (100, 102) and an electromagnetic (EM) transmitter-receiver arrangement (104, 106, 108, 110) to determine difference in ultrasound and EM time of flight and therefore whether or not the remote interface (Continued)

device is permitted to monitor and/or control the machine or is within range to monitor and/or control the machine.

13 Claims, 4 Drawing Sheets

(56) References Cited

U.S. PATENT DOCUMENTS

| | | | | |
|---|---|---|---|---|
| 8,060,256 | B2* | 11/2011 | Kong | G05D 1/0272 367/128 |
| 8,165,527 | B2* | 4/2012 | Sims | G08C 19/28 455/345 |
| 8,306,684 | B2* | 11/2012 | Nakano | G05D 1/027 701/25 |
| 10,528,058 | B2* | 1/2020 | Xiong | G05D 1/0242 |
| 2007/0038341 | A1 | 2/2007 | Rieger et al. | |
| 2007/0136693 | A1* | 6/2007 | Lilleness | H04N 21/41265 345/169 |
| 2007/0173212 | A1* | 7/2007 | Mergler | G08C 19/28 455/92 |
| 2007/0280052 | A1 | 12/2007 | Kong et al. | |
| 2008/0009974 | A1* | 1/2008 | Kong | G01S 5/30 901/1 |
| 2008/0154429 | A1* | 6/2008 | Lee | G05D 1/027 901/1 |
| 2009/0292375 | A1* | 11/2009 | Thompson | G08C 19/28 700/86 |
| 2010/0063652 | A1 | 3/2010 | Anderson | |
| 2010/0253623 | A1 | 10/2010 | Wei et al. | |
| 2010/0292839 | A1* | 11/2010 | Hong | B25J 5/00 700/253 |
| 2013/0149967 | A1 | 6/2013 | Ma et al. | |
| 2016/0000290 | A1* | 1/2016 | Kwak | G05D 1/0088 901/30 |
| 2016/0076356 | A1 | 3/2016 | Krems et al. | |
| 2016/0379482 | A1 | 12/2016 | Saito et al. | |
| 2017/0205803 | A1 | 7/2017 | Okamoto et al. | |
| 2018/0216941 | A1* | 8/2018 | Zhu | G05D 1/0282 |
| 2018/0348788 | A1* | 12/2018 | Xiong | G05D 1/0272 |
| 2020/0264303 | A1* | 8/2020 | Schwab | H01Q 1/007 |
| 2022/0130233 | A1* | 4/2022 | Appleyard | G01S 11/16 |

FOREIGN PATENT DOCUMENTS

| | | |
|---|---|---|
| JP | 2014075105 A | 4/2014 |
| JP | 2015177304 A | 10/2015 |

OTHER PUBLICATIONS

International Search Report and Written Opinion for Application No. PCT/AU2019/051153 dated Jan. 10, 2020 (18 pages).
Australian Patent Office International-type Search for Application No. 2018904006 dated Jun. 18, 2019 (15 pages).
Japanese Patent Office Notice of Reasons for Rejection for Application No. 2021-520584 dated Jul. 21, 2022 (9 pages including English translation).

* cited by examiner

WIRELESS MONITORING/CONTROL

FIELD OF THE INVENTION

One or more forms of the present invention is applicable to wireless communication for use in monitoring and/or control of machines, such as engineering and manufacturing workshop machines, presses (e.g. press brakes, hydraulic presses, stamping and forging machines), mills, lathes, industrial robots (e.g. robotic welders) and plasma cutters.

One or more forms of the present invention can be applied to a system and/or method for sending and/or receiving data, preferably over short range, by wireless communication system.

One or more forms of the present invention can be applied to proximity/distance detection and/or measurement for safety purposes.

BACKGROUND TO THE INVENTION

Machines (such as process, engineering and manufacturing plant) typically have a safety system to protect the operator and other personnel within the immediate vicinity of the machine. Examples of such machines are press brakes for sheet metal bending, vertical and horizontal lathes and milling machines, plasma cutters, robotic welding machines etc.

It is common for such machines to have hardware-based safety systems providing an emergency stop function and machine control hardwired directly to a controller for the respective machine. The consequences of this are cost-intensive cabling and restricted options for positioning the vital emergency stop and user control interfaces.

A solution to such limitations is remote control and emergency stop functions provided by a hard-wired control device connected directly to the machine. With the control device movable relative to the machine because of the hard-wired flexible cable, user interface and emergency stop controls can be positioned more flexibly within the available space and for operator preference relative to the machine and tasks at hand.

Ethernet Powerlink (commonly simply called Powerlink), and similar systems, provide an open protocol for safety critical control between slave and master controllers provided for safety and control for such machines.

With a Powerlink a system, a user control interface can be provided hard wired physical cable connection to, but remote from, the machine. Operation information between the user control interface and the machine is handled by isochronous data exchange requiring sending and receiving of cyclic poll requests and poll responses, followed by interchange of asynchronous data through the same channel. Data is sent to multiple devices in a 'daisy-chain' polling arrangement. The data may be for one device or may be for multiple devices. Consequently, the data contains relatively large 'packets' of information including ID information. This results in a system that demands relatively high power supply requirements.

It has been realised that data exchange between a machine and a remote monitoring/control device can be made wireless whilst managing or limiting power demands of the remote monitoring/control device operating on stored charge reserves (such as battery and/or capacitor storage).

It has further been realised that safety critical data exchange between a remote control interface and a machine can be improved.

It has still further been realised that proximity detection and/or distance measurement for a wireless remote control/user interface can be very useful, particularly where operation of machines involves safety critical control/monitoring.

It is with one or more limitations in existing safety monitoring/control equipment, particularly wireless safety monitoring/control equipment, that one or more forms of the present invention has been developed.

SUMMARY OF THE INVENTION

Remote communication for monitoring/control.

It will be appreciated that one or more forms of the present invention relates to wireless protocol(s)/systems/methods for communication between a remote device and a machine for monitoring or control, or monitoring and control, of the machine.

One or more embodiments of the present invention generally relate to protocols, systems and methods for establishing a dual channel communication link between devices, such as a press and a remote (preferably wireless) user interface/controller.

One or more embodiments of the present invention generally relate to protocols, systems and methods for establishing a proximity detection and/or distance measurement communication between devices relating to safety critical operations for machines.

With the aforementioned in mind, an aspect of the present invention provides a wireless remote communication system for use in monitoring and/or controlling a machine, the system including dual channel wireless communication between a remote interface device being remote from a machine and at least one communication module connected to the machine.

The remote interface device can be or include a wireless control device for use in monitoring and/or controlling a machine. The Wireless interface device may include a display screen, such as for displaying parameters/functions of the machine being monitored. The wireless interface device may include one or more controls for controlling one or more respective functions of the machine, such as a stop/emergency stop control, an up command control for a press etc.

A further aspect of the present invention provides a wireless communication system for use in monitoring and/or controlling a machine, the system including a remote interface device having two remote transmitters and two remote receivers, the remote transmitters arranged and configured to transmit data in parallel to one another each to a respective one of two receivers connected to the machine for operative control of the machine, and the remote receivers arranged and configured to receive data from respective ones of two transmitters connected to the machine and transmitting the data in parallel to one another.

Preferably the remote interface device includes a first remote communicator having a first said remote transmitter and a first said remote receiver configured to communicate data wirelessly with a first communication module connected to the machine, and a second remote communicator having a second said remote transmitter and a second said remote receiver configured to exchange data wirelessly with a second communication module connected to the machine, the first and the second communicators arranged to transmit and/or receive data in parallel to one another to and from the respective first and second communication modules.

The capability to exchange data between the remote interface device and the machine, as for control commands to the machine (e.g. emergency stop and/or normal operation functions) over two channels (e.g. in parallel) rather than over a single channel helps to reduce the amount of information over any one channel, thereby speeding up transfer of data and/or allowing additional data to be exchanged at any one time. This improves safety and/or productivity for the machine and machine operators.

One or more embodiments of the dual channel communication configuration and/or arrangements of the present invention reduces power requirements for wireless safety critical communication between devices compared with a single channel data communication, such as the aforementioned Powerlink.

Preferably the first and second communication modules communicate with a controller of the machine for control thereof.

The remote interface device may be battery and/or capacitor powered. Preferably the respective battery and/or capacitor is/are chargeable/rechargeable from one or more solar panels provided on or electrically connected to the remote interface device.

The remote interface device may include an emergency stop control ability for the machine. For example, operation of an emergency stop control on the remote interface device may effect a real time or near real time immediate stop of operation of the machine.

The remote interface device may include at least one foot pedal as a control input device for controlling one or more operations of the machine, with commands communicated wirelessly between the remote interface device and the receivers connected to the machine.

Preferably the system complies with SIL 3 category safety control. Safety Integrity Level (SIL) is defined as a relative level of risk-reduction provided by a safety function, or to specify a target level of risk reduction. SIL is a measurement of performance required for a safety instrumented function (SIF).

The requirements for a given SIL are not consistent among all of the functional safety standards. In the functional safety standards based on the IEC 61508 standard, four SILs are defined, with SIL 4 the most dependable and SIL 1 the least.

A SIL is determined based on a number of quantitative factors in combination with qualitative factors such as development process and safety life cycle management. SIL 3 requires a dependable emergency stop function for machines.

The remote interface device may include a user/operator display to show command and/or function options and preferably allow input via a touchscreen interface.

The remote interface device may include at least one port for hardwire connection of a data and/or power cable, such as an umbilical cable for connection between the machine and the remote interface device.

Another aspect of the present invention provides a method or protocol of/for providing wireless communication for use in monitoring and/or controlling a machine, the method including dual channel wireless communication between a remote interface device and a machine control device connected to the machine.

A further aspect of the present invention provides a procedure or protocol for wireless communication for use in monitoring and/or controlling a machine, the procedure or protocol including providing dual channel wireless communication between a remote interface device being remote from a machine and at least one communication module connected to the machine.

A further aspect of the present invention provides a protocol or procedure for use in remotely controlling a machine, the protocol or procedure including the steps of communicating over two separate channels between a remote interface device and the machine for operative control of the machine.

Preferably, the communicating includes transmitting and receiving data in parallel over the two channels.

Preferably the data is transmitted between two remote transmitters of the remote interface device and two receivers connected to the machine, and between two transmitters connected to the machine and two remote receivers of the remote interface device.

Preferably, the remote transmitters are arranged and configured to transmit data in parallel to one another each to a respective one of the two receivers connected to the machine, and the remote receivers are arranged and configured to receive data from respective ones of two transmitters connected to the machine and transmitting the data in parallel to one another.

Another aspect of the present invention provides a dual channel wireless control system for use in remotely controlling a machine, the system including a remote control module having two remote transmitters and two remote receivers, the remote transmitters arranged and configured to transmit data in parallel to one another each to a respective one of two receivers of a machine side module for connection to the machine, and the remote receivers arranged and configured to receive data from respective ones of two transmitters of the machine side module connected to the machine and transmitting the data in parallel to one another.

For ease of understanding, the phrase 'machine side module' refers to a module used at the machine, and preferably, which integrates or communicates with the machine safety controller.

'Remote side' refers to the remote interface device away from the machine.

It will be appreciated that one or more forms of a dual channel communication protocol/system/method of the present invention may include a data transmission and data receiving followed by a period of standby/sleep mode cycle, before the next transmit-receive-sleep cycle.

The standby or sleep period can be between 5 ms and 1 day, preferably between 5 ms and 10 hours, more preferably between 10 ms and 10 hours, yet more preferably between 10 ms and 1 hour, and even yet more preferably between 10 ms and 100 ms.

It will be appreciated that data packets for sending and receiving within one or more embodiments of the present invention can contain less information than is required in a single channel communication system such as Powerlink, and can be transmitted over a shorter period of time that required for such a single channel system, and can be transmitted less often than is transmitted in such a single channel system. Thus, a data communication protocol/system/method of one or more forms of the present invention can be more power efficient than aforementioned single channel systems/methods. Power efficiency can be vital in wireless systems, particularly where there is a need for reliable safety critical equipment/procedures.

According to one or more embodiments of the present invention, data checking is conducted away from the wireless remote module and the machine module. Data checking of data transmitted from one to the other can be carried out at the machine safety controller level, thus reducing data transmission times (because less data need be transmitted). Data can be transmitted over two channels i.e. in parallel.

The remote control module may include a remote communication device including a first remote communicator having a first said remote transmitter and a first said remote receiver configured to communicate data wirelessly with a first communication module of the machine side module connected to the machine, and a second remote communicator having a second said remote transmitter and a second said remote receiver configured to exchange data wirelessly with a second communication module of the machine side module connected to the machine.

Preferably, the first and the second communicators arranged to transmit and/or receive data in parallel to one another to and from the respective first and second communication modules.

Proximity/Distance Measurement

Another aspect of the present invention provides a method of determining proximity and/or distance of a remote interface with respect to a machine that the remote interface device is configured to wirelessly monitor and/or control, whereby travel time between first and second signals sent between the machine and the remote interface device is used to determine whether or not the remote interface device is permitted to monitor and/or control the machine or is within range to monitor and/or control the machine.

A further aspect of the present invention provides a method of determining whether a remote interface device is within required range or zone associated with a machine that the remote interface device is configured to wirelessly monitor or control, whereby a difference in travel time between first and second signals sent to the remote interface device or from the remote interface device is used to determine that the remote interface device is within a range or zone permitted monitoring and/or control of the machine.

Another aspect of the present invention provides a method of determining whether a remote interface device is within required range or zone associated with a machine that the remote interface device is configured to wirelessly monitor and/or control, whereby travel time between first and second signals sent between the machine and the remote interface device is used to determine whether or not the remote interface device is permitted to monitor and/or control the machine or is within range to monitor and/or control the machine.

Preferably a difference in travel time between the first and the second signals is used to determine proximity and/or distance measurement of the remote interface device relative to the machine.

The difference may be compared to one or more threshold distance and/or zone values. For example, if the difference falls within the respective distance and/or zone value(s), the machine continues to be monitored and/or controlled by the remote interface device. Alternatively, or in addition, if the difference falls outside the respective distance and/or zone value(s), the machine is stopped or slowed or a user alert is provided.

Preferably, at least one directional transmitter is provided, such as one or more ultrasonic transmitters, for directional focus of a proximity/distance sensing signal.

The difference may be used to determine whether the remote interface device is within (or outside of) a threshold distance or zone with respect to the machine.

Preferably the first and second signals are electromagnetic and/or ultrasonic signals.

Preferably, the method includes simultaneously sending an electromagnetic signal (such as IR, RF) and a sonic signal (such as ultrasonic), and a reception time delay between the electromagnetic signal and the sonic signal is used to determine a distance between the remote interface device and the machine.

More preferably, the method includes determining a return time of flight of an electromagnetic signal, determining a return time of flight of a sonic signal, and calculating a difference between the return time of flight of the electromagnetic signal and the sonic signal to determine a distance measure of the remote interface device from the machine.

Preferably the sonic signal is an ultrasonic signal.

It will be appreciated that electromagnetic signals travel at $\sim 3 \times 10^8$ ms$^{-1}$ and ultrasound signals travel at $\sim 340$ ms$^{-1}$ in air.

For a typical operating distance between the remote interface device and the machine, the reception delay between the electromagnetic and the ultrasonic signals is approximately 0.3 m/ms.

Preferably, if the distance measure is within a predetermined value, the remote interface device is deemed within range of the machine and operation of the machine can be maintained. If the distance measure is beyond a threshold value, the remote interface device is deemed outside of a range of operation and the machine either cannot be operated by the remote interface device or the machine stops (such as when the remote interface device is inadvertently taken out of range of the machine).

Preferably, wireless communication between the remote interface device and the machine may include radio frequency (RF) communication, such as 2.4 GHz transmission frequency communication.

Preferably, a said electromagnetic signal and a said ultrasonic signal are transmitted simultaneously.

Another aspect of the present invention provides a system for use in determining whether a remote interface device is within required range or zone associated with a machine that the remote interface device is configured to wirelessly monitor and/or control, wherein at least one transmitter is configured to transmit a first signal and a second to or from the remote interface device, and a processing means determines travel time between the first and second signals and determines whether or not the remote interface device is permitted to monitor and/or control the machine or is within range to monitor and/or control the machine.

Preferably the processing means is configured to determine a difference in travel time between the first and the second signals to determine proximity and/or distance measurement of the remote interface device relative to the machine.

Preferably, at least one directional said transmitter is provided, such as one or more ultrasonic transmitters, for directional focus of a proximity/distance sensing signal.

Preferably the at least one transmitter includes at least one electromagnetic transmitter and/or at least one ultrasonic transmitter.

Preferably the system includes one or more respective receivers to receive the respective electromagnetic and/or ultrasonic signal.

Preferably, the electromagnetic transmitter(s) and the ultrasonic transmitter(s) are configured to transmit the respective electromagnetic signal (such as IR, RF) and sonic signal (such as ultrasonic).

At least one respective receiver may receive the signals with a time delay between the electromagnetic signal and the sonic signal. The processor may be configured to determine a distance between the remote interface device and the machine.

A processing means, which may be or include the aforementioned processor or may be a second processor, may be configured to determine a return time of flight of an electromagnetic signal, determining a return time of flight of a sonic signal, and calculating a difference between the return time of flight of the electromagnetic signal and the sonic signal to determine a distance measure of the remote interface device from the machine. The processing means may be provided at the machine or at the remote interface device.

Preferably at least one said sonic signal is transmitted by a respective at least one ultrasonic transmitter. Preferably the at least one said sonic signal is received by a respective at least one ultrasonic receiver.

The machine may include at least one slave module connected to a controller for controlling machine functions.

The at least one slave module may be placed on the machine or nearby the machine. However, the function of the or each slave module is to communicate with (receive from and/or transmit to) the remote interface device.

The respective slave module(s) may be deemed to be part of the machine even if an add-on component/module, such as part of a retrofit safety/control system.

Preferably, two or more ultrasonic transmitters are provided connected to the machine, such as one at each corner to give spatial coverage for a zone adjacent the machine. The remote interface device may include at least one ultrasound receiver, preferably one such receiver per ultrasound transmitter.

Preferably, if the distance measure is within a predetermined value, the remote interface device is deemed within range of the machine and operation of the machine can be maintained. If the distance measure is beyond a threshold value, the remote interface device is deemed outside of a range of operation and the machine either cannot be operated by the remote interface device or the machine stops (such as when the remote interface device is inadvertently taken out of range of the machine).

Preferably, two or more ultrasonic transmitters are provided connected to the machine, such as one at each corner to give spatial coverage for a zone adjacent the machine. The remote interface device may include at least one ultrasound receiver, preferably one such receiver per ultrasound transmitter.

Preferably, wireless communication between the remote interface device and the machine may include radio frequency (RF) communication, such as 2.4 GHz transmission frequency communication.

Preferably, a said electromagnetic signal and a said ultrasonic signal are transmitted simultaneously, preferably transmission thereof controlled by the machine module and/or processing means at the machine side.

Two or more ultrasonic transmitters can be functionally connected to the machine giving spatial coverage for at least one zone adjacent the machine.

The remote interface device may include a foot switch/pedal and/or a stop control to stop, when operated, one or more operations of the machine.

BRIEF DESCRIPTION OF THE DRAWINGS

One or more embodiments of the present invention will hereinafter be described with reference to the accompanying Figures, in which.

DESCRIPTION OF PREFERRED EMBODIMENT

Figure 1:
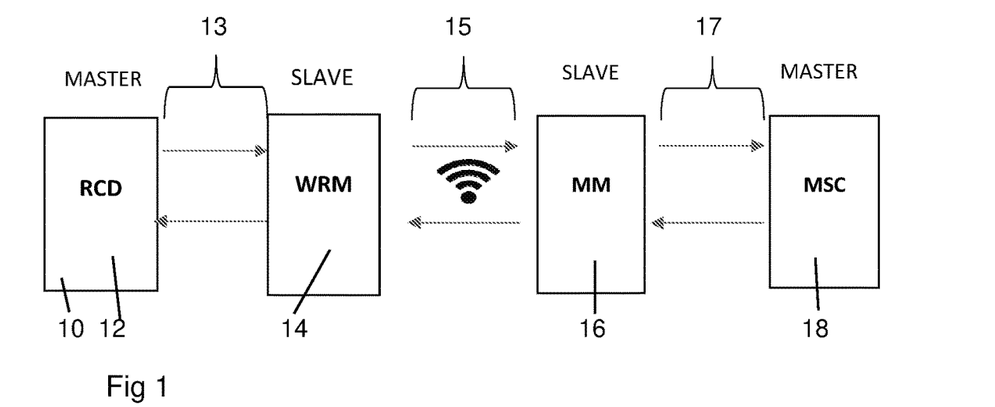
FIG. 1 shows, for ease of understanding, a simplified diagrammatic representation of a wireless control arrangement for a remote interface device (RCD) (such as a foot pedal and/or emergency stop switch or other control device) to interface wirelessly with a machine safety controller MSC for control of a machine (such as a press brake, robotic arm, plasma cutter etc.)

As shown by way of example in FIG. 1, a user interface 10, such as a remote monitoring/control device (RCD) 12 includes a control input device/interface, such as a foot switch/pedal, switch (such as an emergency stop button), touchscreen, or combinations of two or more thereof.

The RCD communicates with a wireless remote module (WRM) 14 connected to the RCD. The WRM can be incorporated with the RCD or can be a connectable/plug-in device. Communication 13 can be wired or wireless.

The RCD and WRM can communicate periodically e.g. every 10 ms to check that functions of the RCD and/or WRM are operational and as expected within parameters.

A failure of a control device, such as an emergency stop button, can initiate communication between the WRM and a machine module (MM) 16 or create a loss of communication, such that the MM relays to the machine safety controller (MSC) 18 to cease operation of the machine.

The WRM communicates 15 wirelessly with the machine module (MM) via two communication channels operating in parallel to one another.

The MM can be hard wired to communicate 17 to the machine safety controller (MSC), such as is incorporated in a machine as part of a control system for the machine. The machine can be, for example, a press brake, plasma cutter, robotic arm (such as a robotic welder), lathe or mill. The MM can communicate over two hard wired connections, or a single connection such as over Ethernet connections, to the MSC.

The MM may be an add-on (retrofit) module to the machine or can be incorporated with the machine as part of the OEM control system.

Preferably the WRM combines data to packets and sends the data packets to the MM.

The MM may 'listen' for receipt of data packets from the WRM and confirms receipt back to the WRM when received.

At the machine side, data received by the MM can be combined into standard data protocol information, such as standard Ethernet Powerlink information, and be communicated to the machine safety controller (MSC).

Preferably the data can be provided from the MM to the MSC in a protocol, such as the Ethernet Powerlink protocol, so typical safety PLCs can check the received data in a safe manner.

Figure 2:
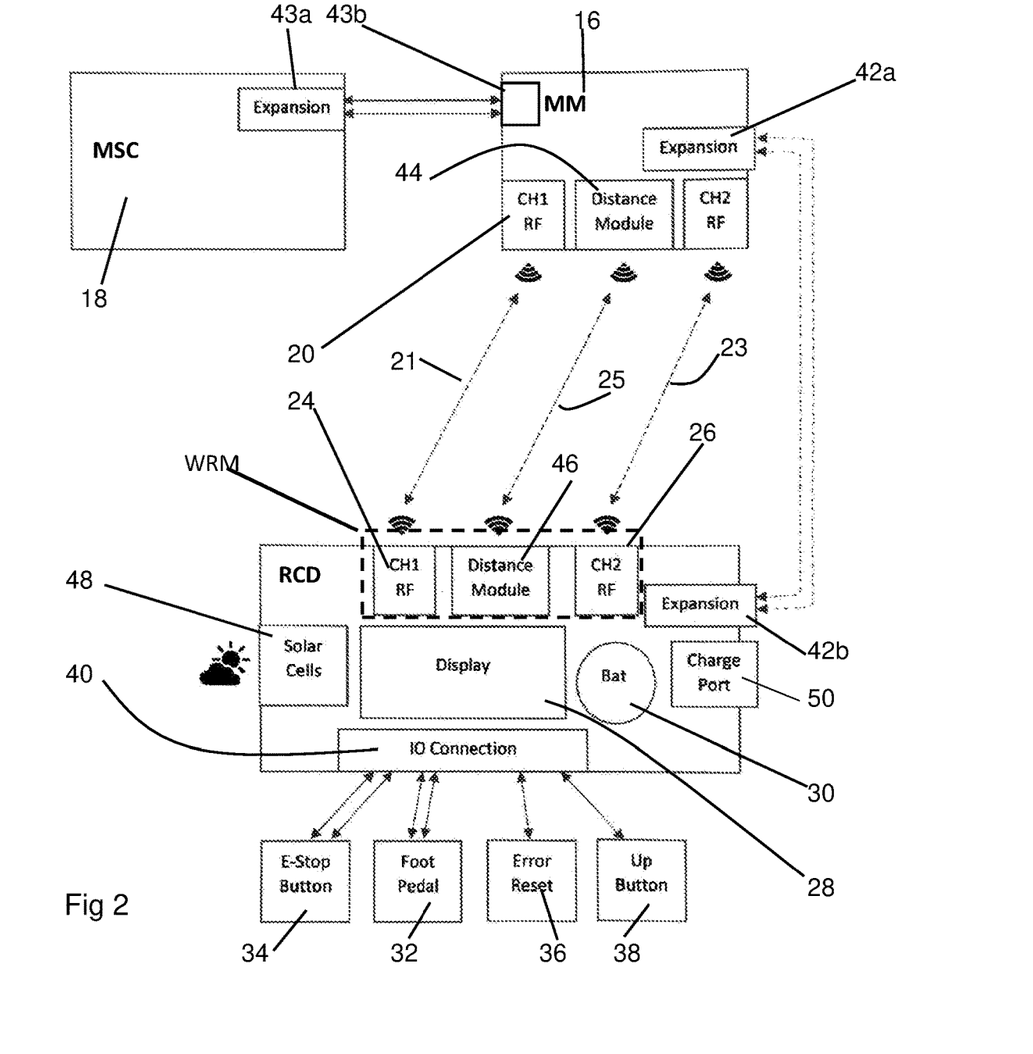
FIG. 2 shows further detail of an arrangement for a system and methodology for wirelessly controlling a machine over two parallel data communication channels, and having distance measurement functionality, according to an embodiment of the present invention.

FIG. 2 shows detail of a system and/or protocol according to at least one embodiment of the present invention.

The machine module (MM) includes two channel 20, 22 (channel 1—CH1 and channel 2—CH2) transmitter and receiver capability such that data is communicated between the WRM and the MM over two parallel channels.

The WRM includes two corresponding channels 24, 26 (CH1 and CH2) for corresponding communication with CH1 and CH2 of the MM.

Preferably data communication for control commands is transmitted by radiofrequency (RF) communication, preferably in the 2.4 GHz range.

The remote interface device (RCD) 12 and the wireless remote module (WRM) 14 can be incorporated into a single device, such as a freestanding remote controller. The RCD can include or be operatively connected to one or more foot pedals 32 and/or control buttons and/or touchscreen controls 34, 36, 38 for commanding or confirming operation functions for the machine.

The RCD may include a display screen 28. Battery power may be provided by an on-board battery 30, which may be charged/recharged by a solar panel provided on the RCD.

One or more ultrasound transmitters 44 may be provided on or adjacent the machine. The MM may include or be connected to one or more ultrasound transmitters 44 (distance module). The RCD 12 or WRM 14 may include or be connected to one or more ultrasound receivers 46 (distance module).

The remote interface device (RCD) 12 may include at least one input/output 40 for a control device to connect thereto, such as by the at least one control device plugging into a respective I/O socket of the RCD. The control device may include the emergency stop control/button 34, a foot pedal 32, and error reset control/button 36, machine controls (up, down, retract, do to standby etc.) 38, or two or more thereof.

The machine module (MM) 16 and the wireless remote module (WRM) 14 may be connected through an expansion/auxiliary connection 42a, 42b that can provide further functionality. For example, if sonic proximity/distance measurement and/or electromagnetic (e.g. RF) data communication is possibly compromised or not functioning, such as by loud or certain frequency background noises affecting sonic communication, the expansion/auxiliary connection can act as a bypass between the wireless user interface and the machine controller (MSC).

Likewise, the MSC 18 and the MM 16 may be connected through an expansion/auxiliary connection 43a, 43b that can provide further functionality.

The wireless remote module (WRM) 14 can include a processor, such as a CPU, for each channel of communication (CH1, CH2). Likewise, the machine module (MM) can include a processor for each channel (CH1, CH2).

Preferably each processor will have a unique Media Access Control address (MAC address). That is, 4× MAC addresses altogether: 2× for the WRM and 2× for the MM.

MAC addresses can be paired (1×WRM+1×MM paired to communicate with each other, and 1× other WRM+1× other MM MAC addresses paired to communicate with each other), which can help to avoid data/communication conflicts with other devices within range.

The present invention preferably utilises radio-frequency (RF) technology for low power consumption/power saving. RF products allow for rapid communication with low use of power. The WRM can therefore be standalone without hardwiring to an electrical source for power.

Preferably, according to one or more embodiments of the present invention, a data packet transmitted electromagnetically includes the following contents: Preamble; Address; ID (Identification Packet Number); Data; CRC (Check). A data packet can be about 10 bytes long (80 bits) and may take 60 µs to transmit and a data packet may be transmitted periodically (at regular intervals or at random intervals depending on the set-up), such as every 10 ms The RCD/WRM 12, 14 can operate on solar 48 and/or plug in battery chargers 50 e.g. low voltage transformers, similar to those used by mobile telephones.

For distance/proximity detection and/or measurement, the MM 16 sends an RF signal 21, 23 to the WRM 14 at the same time as sending an ultrasonic signal 25 to the WRM 14. Because of the faster speed of travel of the RF signal compared to the ultrasonic signal, the RF signal is received first.

The time delay between receiving the RF 21, 23 and ultrasonic 25 signals is used to determine the distance that the WRM 14 (and therefore the RCD 12) is from the MM 16 (and therefore from the machine). The distance can be calculated as approximately 0.3 metres (0.3 m) for every 1 millisecond (1 ms) of delay or ~0.3 m/ms.

Multiple ultrasonic transmitters may be provided on or near the machine to give a zone of protection. The WRM and/or RCD can include multiple ultrasonic receivers to accommodate the WRM/RCD being at various angles with respect to the machine.

Preferably, at a period time count (such as at 100 ms intervals), with an RF packet ID, one ultrasonic transmitter outputs a series of pulses which are received by one or more of the ultrasonic receivers at the RCD/WRM that are 'listening simultaneously'.

Preferably, the ultrasonic receiver(s) starts listening only when the RF packet with the correct ID is received.

The ultrasonic receiver first to receive a correct signal above a threshold stops the time count. The time count is preferably used in determining proximity/distance measurement. The timer recommences on the next proximity/distance measurement.

Time between proximity/distance measurement checks can be between 5 ms and 1 day, preferably between 5 ms and 10 hours, more preferably between 10 ms and 10 hours, yet more preferably between 10 ms and 1 hour, and even yet more preferably between 10 ms and 100 ms. The time between proximity/distance measurement checks can be a random/randomised period.

Figure 3:
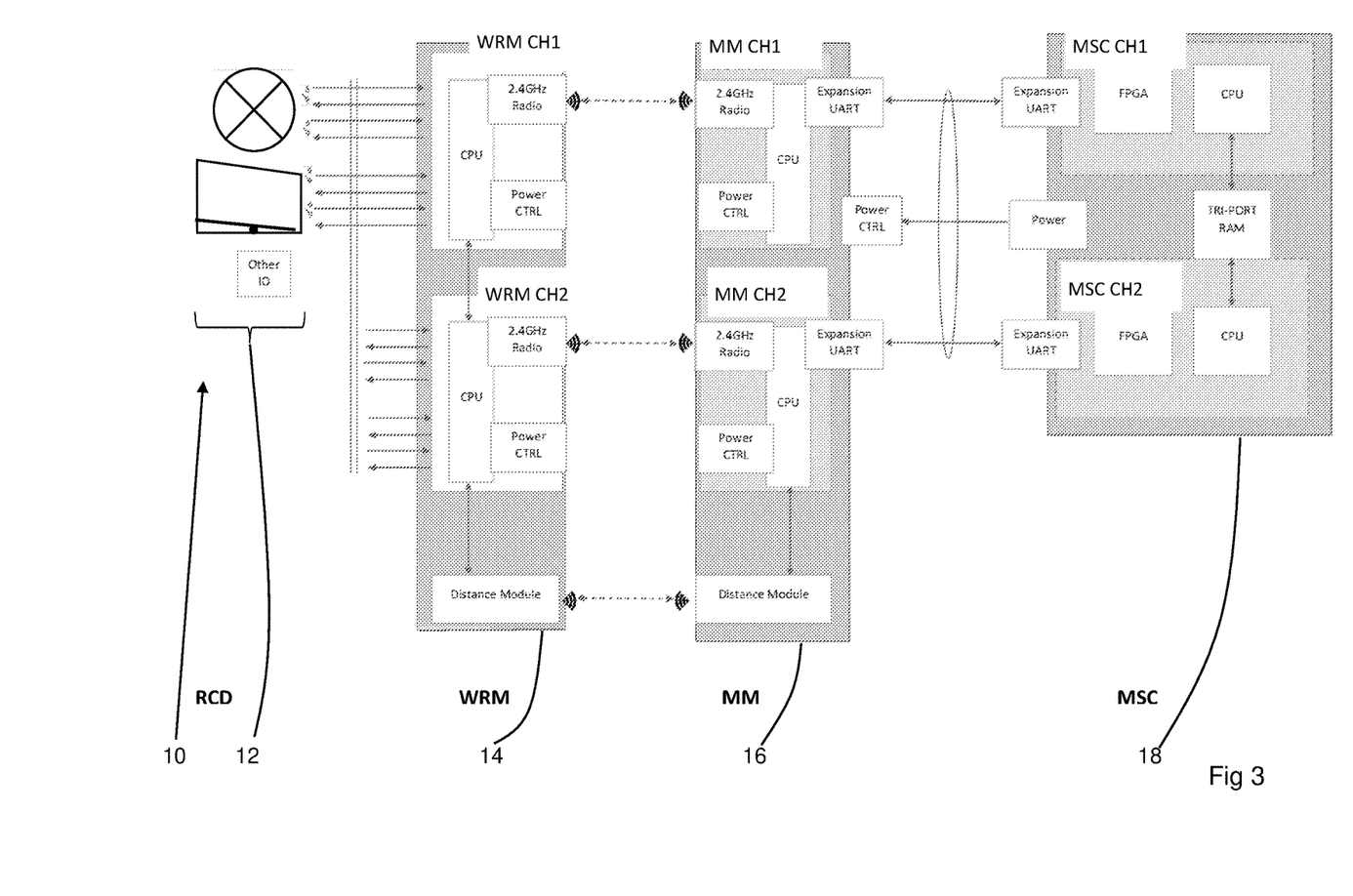
FIG. 3 shows further detail of an arrangement for a system and methodology for wirelessly controlling a machine over two parallel data communication channels, and having distance measurement functionality, according to another embodiment of the present invention

FIG. 3 shows further detail of an arrangement of the system and function applicable to a machine having a machine safety controller (MSC) 18.

Preferably, data can be provided from the MM 16 to the MSC 18 in a protocol, such as the Ethernet Powerlink protocol, so typical safety programmable logic controllers (PLCs) can check the received data in a safe manner.

Communication between the machine module (MM) 16 and the machine safety controller (MSC) 18 can be by safety hard-wired protocol. For example, between respective universal asynchronous receiver-transmitter (UART) devices or similar proprietary devices for use with specific MSCs, for asynchronous serial communication in which the data format and transmission speeds are configurable. Such communication can be provided over cables, such as over Ethernet cables.

Figure 4:
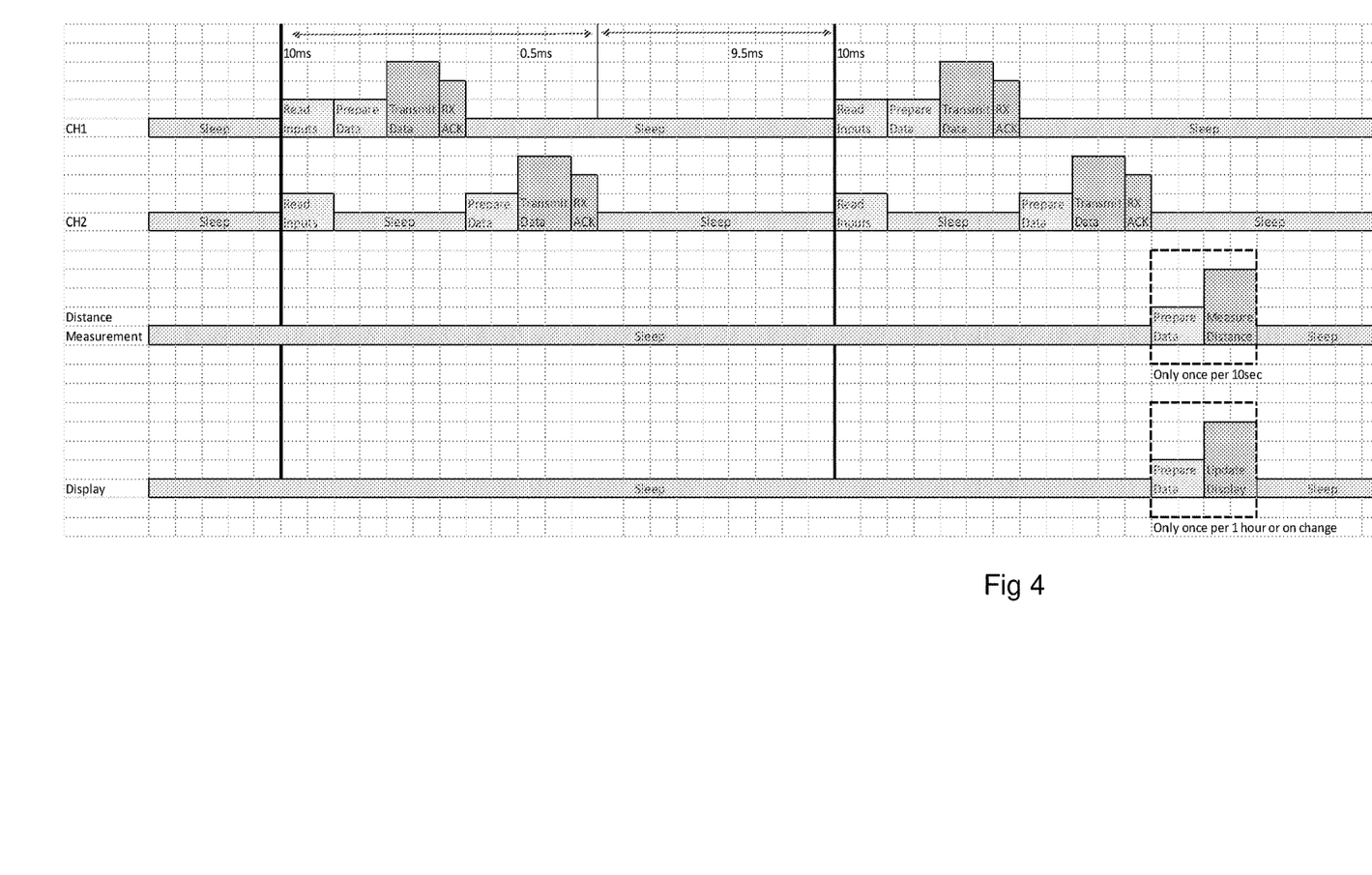
FIG. 4 shows a protocol timeline for data communication and distance measurement for a remote interface device for use in controlling a machine.
Figure 5:
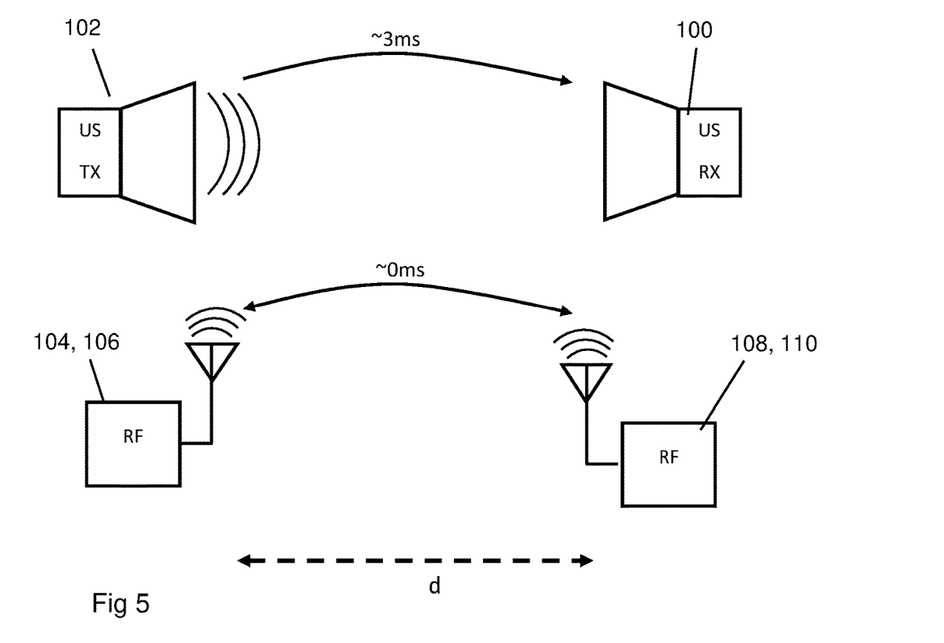
FIG. 5 shows a diagrammatic representation of signal transmission between ultrasonic transmitter and receiver, and between an RF transmitter and RF receiver, for use in determining proximity/distance of a device form a machine.
Figure 6:
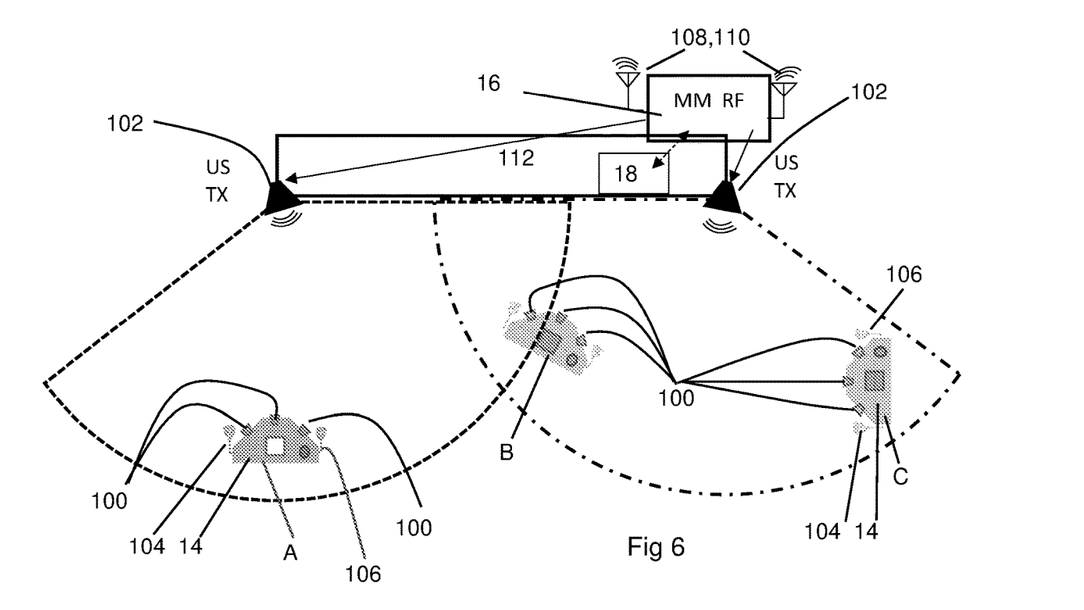
FIG. 6 shows a proximity/distance determining system/method for a wireless remote user interface relative to a machine, according to an embodiment of the present invention.

An embodiment of an operation/protocol in use of the present invention is shown by way of example in FIGS. 4 to 6.

To avoid conflict between multiple machines each having a remote wireless user interface, the distance/proximity check for one machine-wireless user interface can be compared with one or more previous distance/proximity checks for the same machine-wireless user interface. This can ensure that the wireless user interface is within expected/required bounds/distance limit(s).

Every 10 ms the WRM 14 sends an RF packet to with an ID to the MM 16. The ID number is preferably incremented periodically, such as every 10 ms.

The WRM 14 uses one or more RF transmitters/transceivers 104, 106 to send via CH1 and CH2 (i.e. different channels and addresses) the RF packet of data with the same ID number one after the other i.e. sends the packet of data time separated over the two channels CH1 and CH2.

The MM 16 replies via at least one transmitter/transceiver 108, 110 with an acknowledgement packet with the same ID back to the WRM 14.

CH1 on the WRM 14 sends an RF packet e.g. with an ID (say, 10). CH1 on the MM 16 acknowledges the RF received with the ID (e.g. 10) and MM simultaneously sends an ultrasonic pulse from at least one ultrasonic transmitter 102.

CH1 on the WRM 14 receives the RF packet acknowledgement and commences the ultrasonic receivers 100 and preferably pulse detection programming/software on the WRM 14.

A timer 112 commences on the WRM 14. The ultrasonic receivers 100 simultaneously or consecutively monitor for the incoming ultrasonic signal from the ultrasonic transmitter(s) 102. When one of the ultrasonic receivers 100 detects an ultrasonic signal, the time count is stopped. The time taken for the ultrasonic signal to be transmitted and received is converted to a distance (e.g. 'd') and saved.

CH1 of the WRM 14 sends an RF packet, e.g. with an ID (say, 20). CH1 on the MM 16 acknowledges the RF ID (e.g. 20) and waits a period of time, such as 3 ms, and then sends an ultrasonic pulse from the first ultrasonic transmitter 102.

CH1 on the WRM 14 receives the RF packet acknowledgement. The WRM 14 commences the ultrasonic receivers 100 and pulse detection software. A timer is also commenced. The ultrasonic receivers 100 simultaneously or consecutively monitor for the incoming ultrasonic signal. When one of the ultrasonic receivers 100 detects the incoming ultrasonic pulse, the timer is stopped and the time taken for the ultrasonic signal to be sent and received is calculated. The time of travel has the 3 ms deducted and is converted to distance and saved.

CH2 of the WRM 14 sends an RF packet, e.g. with an ID (say, 30). CH2 on the MM 16 acknowledges the RF ID (e.g. 30) and simultaneously sends an ultrasonic pulse from the first ultrasonic transmitter.

CH2 on the WRM 14 receives the RF packet acknowledgement and commences the ultrasonic receivers and preferably pulse detection programming/software on the WRM 14.

A timer commences on the WRM 14. The ultrasonic receivers 100 simultaneously or consecutively monitor for the incoming ultrasonic signal from the ultrasonic transmitter(s) 102. When one of the ultrasonic receivers 100 detects an ultrasonic signal, the time count is stopped. The time taken for the ultrasonic signal to be transmitted and received is converted to a distance and saved.

CH2 of the WRM 14 sends an RF packet, e.g. with an ID (say, 40). CH2 on the MM 16 acknowledges the RF ID (e.g. 40) and waits a period of time, such as 3 ms, and then sends an ultrasonic pulse from the first ultrasonic transmitter.

CH1 on the WRM 14 receives the RF packet acknowledgement.

The WRM 14 commences the ultrasonic receivers 100 and pulse detection software. A timer is also commenced.

The ultrasonic receivers 100 simultaneously or consecutively monitor for the incoming ultrasonic signal.

When one of the ultrasonic receivers 100 detects the incoming ultrasonic pulse, the timer is stopped and the time taken for the ultrasonic signal to be sent and received is calculated.

The time travel tine has the 3 ms deducted and is converted to distance and saved.

The aforementioned steps of transmitting the RF ID (e.g. 10 and 20) over CH1, and RF ID (e.g. 30 and 40) over CH2, and transmission, receiving and measuring the distance are repeated for each additional ultrasonic transmitter 102 associated with the MM 16, and then the cycle commences again.

When a cycle has progressed once through all of the ultrasonic transmitters 102 provided, at least one, preferably all, of the distances between the respective transmitter and receiver at the RCM are used to determine the distance of the RCD 12 from the machine 112 or MM 16 or whether the RCD 12 is within a required or safe proximity to the machine 112.

The distance value for at least one of the ultrasonic transmitter-receiver pairs on both CH1 and CH2 must be below a threshold value and the delay time must be within a range of allowed parameters. The controls provided at the RCD are then allowed to be active and the machine respond to the controls.

As shown in FIG. 5, an ultrasonic transmitter 102 (US TX) sends an ultrasonic signal to be received by an ultrasonic receiver 100 (US RX). For this example, the time between sending and receiving is 3 ms. However, it will be appreciated that greater or smaller distances can result in a longer or shorter time of flight between transmission and reception. It will be appreciated that the US TXs may be provided on the RCD and the US RXs on the machine.

As stated previously, the distance (d) between the ultrasonic transmitter 102 and the ultrasonic receiver 100 can be calculated as approximately 0.3 metres (0.3 m) for every 1 millisecond (1 ms) of delay or ~0.3 m/ms. Therefore, for a 3 ms delay, the distance between the ultrasonic transmitter (US TX) and receiver (US RX) would be ~1 m, which would represent the distance between the machine 112 and the remote user interface 10, 12.

FIG. 5 also shows an electromagnetic (RF) transmitter-receiver arrangement 104, 106, 108, 110. The effective travel time for a signal is 0ms for the distance (d) involved (~1 ms as above). It will be appreciated that, for practical distances between a remote user interface 10, 12 and the machine 112, the effective travel time for the electromagnetic (EM) signal is 0ms.

FIG. 6 shows an arrangement, by way of example, of a proximity/distance determining system and method for use in detecting whether a remote user interface/remote control device 10, 12 (three shown in different positions, A, B, C) is within an expected/required zone or within a distance threshold/limit relative to a machine, such as a press, press brake, lathe, industrial robot etc. The positions A, B C represent alternative positions of where the remote user interface might be within the coverage zone(s).

Ultrasonic transmitters 102 US TX are spaced on the machine 112. An ultrasonic signal from one of them is received by one of the ultrasonic receivers 100 US RX on the remote user interface, A, B or C.

An electromagnetic (EM) signal (RF) is sent from the machine module (MM 16) transmitter 108, 110) at the same time as the ultrasonic signal(s) is/are sent.

The time difference between reception of the electromagnetic (EM) signal and the ultrasonic signal is used to determine whether the remote user interface (RCD) is within an expected or required distance or zone from the machine 112. If the calculated distance falls outside of the expected distance/zone, an alert can be sent and/or operation of the machine stopped for safety.

The invention claimed is:

1. A method of providing wireless communication for use in controlling a machine, the method including:
   sending, using one or more radio frequency transmitters/transceivers of a remote interface device, a radio frequency packet of data comprising an identification number, over a first channel of communication;
   sending, using at least one transmitter/transceiver of a machine module, an acknowledgement packet comprising the identification number, over the first channel of communication;
   sending, by at least one ultrasonic transmitter of the machine module, an ultrasonic pulse, simultaneously with the sending of the acknowledgement packet;
   receiving, at the one or more radio frequency transmitters/transceivers, the acknowledgement packet;
   activating at least one ultrasonic receiver of the remote interface device;
   commencing a timer;
   stopping the timer in response to detecting, using the at least one ultrasonic receiver, the ultrasonic pulse;
   determining a first distance value based on a time count of the timer;
   after sending the radio frequency packet of data over the first channel of communication, sending, using the one or more radio frequency transmitters/transceivers, a second radio frequency packet of data comprising a second identification number, over a second channel of communication;
   sending, using the at least one transmitter/transceiver, an acknowledgement packet comprising the second identification number, over the second channel of communication;
   sending, by the at least one ultrasonic transmitter, a second ultrasonic pulse;
   receiving, at the one or more radio frequency transmitters/transceivers, the second acknowledgement packet;
   activating the at least one ultrasonic receiver;
   commencing a second timer;
   stopping the second timer in response to detecting, using the at least one ultrasonic receiver, the ultrasonic pulse;
   determining a second distance value based on a second time count of the timer;
   enabling activation of one or more controls of the remote interface device in response to one or both of the first distance value and the second distance value being below a threshold value.

2. The method of claim 1, wherein the second ultrasonic pulse is sent after the acknowledgement packet comprising the second identification number.

3. The method of claim 1, wherein the sending of the acknowledgement packet comprising the second identification number and the sending of the second ultrasonic pulse are separated by a delay time.

4. The method of claim 3, wherein the delay time is about 3 ms.

5. The method of claim 1, including determining whether the remote interface device is within a distance or zone associated with the machine that the remote interface device is configured to wirelessly monitor or control, based at least in part on the first distance value and the second distance value.

6. The method of claim 1, wherein if the first distance value and the second distance value are below the threshold value, the machine continues to be monitored or controlled by the remote interface device, or wherein, if the if the first distance value and the second distance value are greater than the threshold value, the machine is stopped or slowed or a user alert is provided.

7. A wireless remote communication system for use in monitoring and/or controlling a machine, the wireless remote communication system comprising:
   a remote interface device comprising:
      one or more radio frequency transmitters/transceivers; and
      at least one ultrasonic receiver; and
   a machine module comprising:
      at least one transmitter/transceiver; and
      at least one ultrasonic transmitter;
   wherein the system is configured to:
      send, using the one or more radio frequency transmitters/transceivers, a radio frequency packet of data comprising an identification number, over a first channel of communication;
      send, using the at least one transmitter/transceiver, an acknowledgement packet comprising the identification number, over the first channel of communication;
      send, by the at least one ultrasonic transmitter, an ultrasonic pulse, simultaneously with the sending of the acknowledgement packet;
      receive, at the one or more radio frequency transmitters/transceivers, the acknowledgement packet;
      activate the at least one ultrasonic receiver;
      commence a timer;
      stop the timer in response to detecting, using the at least one ultrasonic receiver, the ultrasonic pulse;
      determine a first distance value based on a time count of the timer;
      after sending the radio frequency packet of data over the first channel of communication, send, using the one or more radio frequency transmitters/transceivers, a second radio frequency packet of data comprising a second identification number, over a second channel of communication;
      send, using the at least one transmitter/transceiver, an acknowledgement packet comprising the second identification number, over the second channel of communication;
      send, by the at least one ultrasonic transmitter, a second ultrasonic pulse;
      receive, at the one or more radio frequency transmitters/transceivers, the second acknowledgement packet;
      activate the at least one ultrasonic receiver;
      commence a second timer;
      stop the second timer in response to detecting, using the at least one ultrasonic receiver, the ultrasonic pulse;
      determine a second distance value based on a second time count of the timer;

enable activation of one or more controls of the remote interface device in response to one or both of the first distance value and the second distance value being below a threshold value.

8. The system of claim 7, wherein the second ultrasonic pulse is sent after the acknowledgement packet comprising the second identification number.

9. The system of claim 7, wherein the sending of the acknowledgement packet comprising the second identification number and the sending of the second ultrasonic pulse are separated by a delay time.

10. The system of claim 9, wherein the delay time is about 3 ms.

11. The system of claim 7, the remote interface device including at least one of a foot switch/pedal, a stop control to stop, an emergency stop control to wirelessly stop the machine when operated, and wherein the remote interface device complies with SIL 3 category safety control.

12. The system of claim 7, wherein the remote interface device includes or has connected thereto at least one foot operated switch/pedal as a control input device for controlling one or more operations of the machine via the remote interface device, with commands communicated wirelessly between the remote interface device and the at least one transmitter/transceiver.

13. The system of claim 7 for use in determining whether the remote interface device is within required range or zone associated with the machine that the remote interface device is configured to wirelessly monitor and/or control.

* * * * *